UNITED STATES PATENT OFFICE.

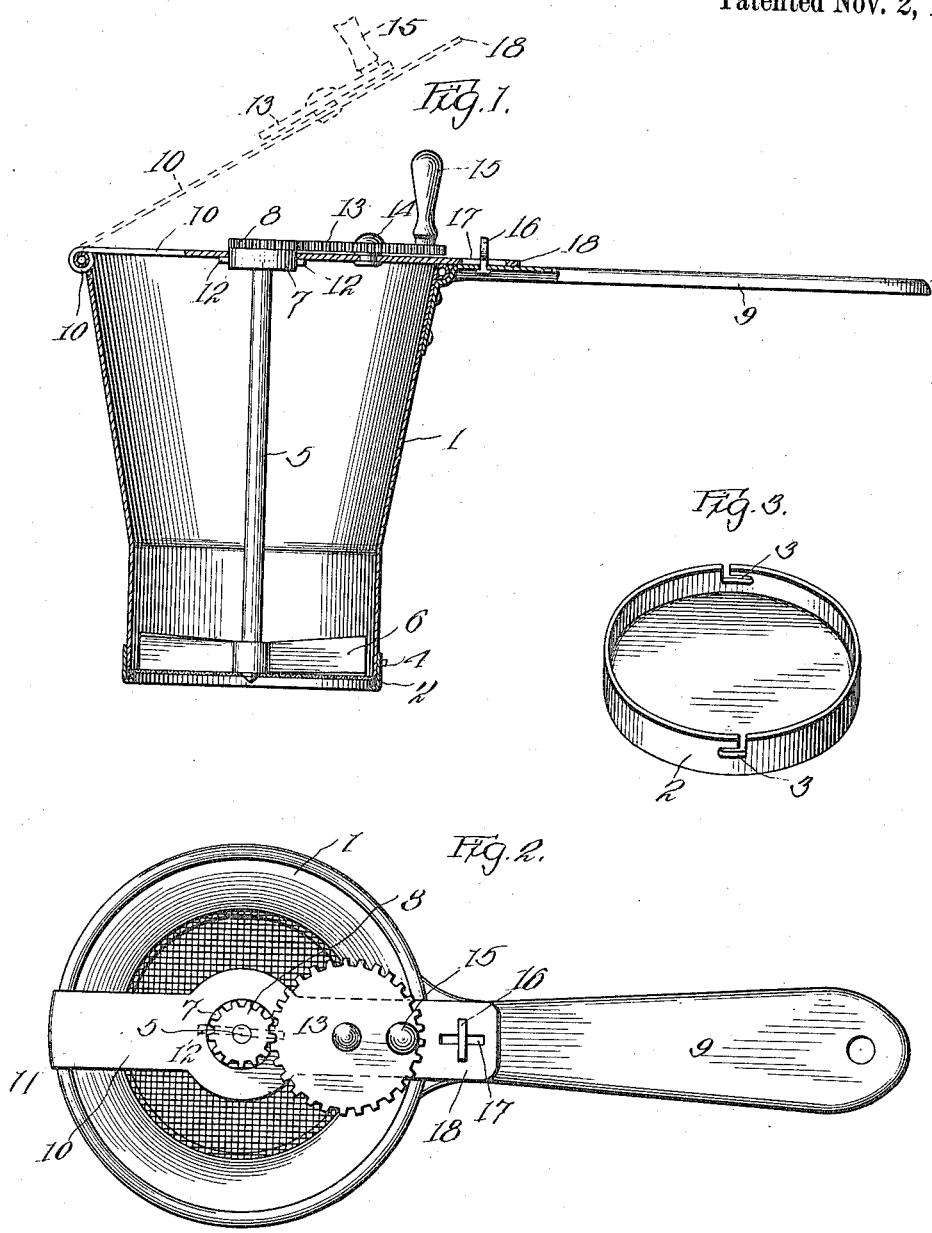

JOSEPH H. UBELAKER AND RAIMUND A. KRMASCHEK, OF CHICAGO, ILLINOIS.

HOUSEHOLD UTENSIL.

1,158,591.   Specification of Letters Patent.   Patented Nov. 2, 1915.

Application filed March 1, 1915.   Serial No. 11,251.

*To all whom it may concern:*

Be it known that we, JOSEPH H. UBELAKER and RAIMUND A. KRMASCHEK, subjects of the Emperor of Austria-Hungary, and residents of the city of Chicago, county of Cook, and State of Illinois, have invented certain new and useful Improvements in Household Utensils, of which the following is a specification.

Our invention relates to improvement in household utensils and particularly to food strainers and the like.

The object of our invention is to so arrange the parts thereof that they may be quickly dismounted for cleaning or other purposes without the aid of tools.

This and other objects we accomplish as fully set forth in the following specification and as more particularly pointed out in the appended claims, reference being had to the accompanying drawings in which a preferred embodiment or adaptation of our invention is shown.

In the drawings, Figure 1 represents a central vertical section through our improved utensil; Fig. 2 is a top plan view of our improved utensil; and Fig. 3 is a detached perspective view of the removable bottom of the utensil.

In referring to the preferred embodiment or adaptation of our invention shown in the accompanying drawings in detail, like numerals, letters, characters, or symbols designate like or corresponding parts.

The body 1 of our improved utensil is of cylindrical form and is preferably provided with a removable bottom 2, which may be of wire mesh, as shown in Fig. 2, or imperforate as shown in Fig. 3. The bottom when constructed in removable form is provided with angular slots 3 in which pins 4 attached to the body fit and lock. The agitating means for mixing the food is removably mounted within the body and comprises a vertical shaft 5, agitating blades 6 on the lower end of said shaft, and a centering disk on the upper extremity of said shaft. The periphery of the disk may be cut out to form a pinion 8 or a separate pinion may be rigidly fastened upon the disk. A horizontal handle 9 projects from one side of the top of the body, and a top supporting bar 10 is hinged to the body on the side opposite the handle by a suitable hinge 11, and is adapted to be swung down upon and suitably fastened to the handle or to be turned up out of the way on its hinge, as shown in dotted lines in Fig. 1 to permit the shaft 5 and its parts to be lifted up and withdrawn from the body. The bar 10 has a center circular opening in which the disk 7 fits and is supported and to limit the movement of the disk through the opening pins 12, are projected horizontally from said disk and extend beneath the bar as shown in Fig. 1. The vertical shaft is manually revolved by a comparatively large gear wheel 13 which is rotatably mounted on a stationary headed pin 14 attached to and extending vertically from the bar 10. The gear wheel 13 meshes with the pinion 8 and is preferably revolved by a handle 15. The supporting bar 10 is locked in its horizontal supporting position by a suitable flattened locking pin 16 which is rotatably secured to the handle 9, and is adapted to be fitted through a longitudinal slot 17 in a projecting portion 18 of the bar 10 and turned to an angle to the slot as shown in Fig. 2.

While we have illustrated and described a preferred form of construction for carrying our invention into effect, this is capable of a wide range of variation, alteration, modification, and change without departing from the spirit of our invention. We, therefore, do not wish to be limited to the construction herein shown and described but desire to avail ourselves of all such variations, alterations, modifications, and changes as fairly fall within the scope of the appended claims or may be construed to be within the scope thereof by invoking the doctrine of equivalents.

What we claim as our invention and deside to secure by Letters Patent is:

1. In a device of the class described, a hollow body, a top supporting bar hinged at one end to one side of said body and adapted to normally extending diametrically across the top of said body, said bar having a central enlargement provided with a circular opening, a vertical operating shaft, agitating blades on the lower end of said shaft, a circular disk on the upper extremity of said shaft rotatably fitted in the circular opening in the bar, a pinion on said shaft over the disk and disposed in a horizontal plane slightly above the supporting bar, and a manually operated gear wheel rotatably mounted on the supporting bar and meshing with the pinion.

2. In a device of the class described, a hollow body, a top supporting bar hinged at one end to one side of said body and adapted to normally extending diametrically across the top of said body, said bar having a vertical enlargement provided with a circular opening, a vertical operating shaft, agitating blades on the lower end of said shaft, a circular disk on the upper extremity of said shaft rotatably fitting in the circular opening in the bar, a pinion on said shaft over the disk and disposed in a horizontal plane slightly above the supporting bar, and a manually operated gear wheel rotatably mounted on the supporting bar and meshing with the pinion; said disk being considerably thicker than the bar and having a portion thereof projecting below, and a horizontal pin fitted through the lower portion of said disk and extending beneath the bar.

In testimony whereof we have hereunto affixed our names in the presence of two witnesses.

JOSEPH H. UBELAKER.
RAIMUND A. KRMASCHEK.

Witnesses:
ROBT. KLOTZ,
JOS. MAIER.

Copies of this patent may be obtained for five cents each, by addressing the "Commissioner of Patents, Washington, D. C."